United States Patent
Twork et al.

(10) Patent No.: US 10,369,953 B2
(45) Date of Patent: Aug. 6, 2019

(54) INTERIOR PANELS INCLUDING SUBSTRATES WITH INSERTS FOR DEFINING INTEGRATED AIRBAG DEPLOYMENT DOORS FOR MOTOR VEHICLES AND METHODS OF MAKING THE SAME

(71) Applicant: Faurecia Interior Systems, Inc., Auburn Hills, MI (US)

(72) Inventors: Michael J. Twork, White Lake, MI (US); Bradley P. Kusky, Swartz Creek, MI (US)

(73) Assignee: Faurecia Interior Systems, Inc., Auburn Hills, MI (US)

(*) Notice: Subject to any disclaimer, the term of this patent is extended or adjusted under 35 U.S.C. 154(b) by 0 days.

(21) Appl. No.: 14/695,679

(22) Filed: Apr. 24, 2015

(65) Prior Publication Data
US 2016/0311391 A1 Oct. 27, 2016

(51) Int. Cl.
| | | |
|---|---|---|
| *B60R 21/2165* | (2011.01) | |
| *B60R 21/215* | (2011.01) | |
| *B29C 45/00* | (2006.01) | |
| *B29C 45/14* | (2006.01) | |
| *B29K 101/12* | (2006.01) | |
| *B29L 31/30* | (2006.01) | |

(52) U.S. Cl.
CPC ...... *B60R 21/2165* (2013.01); *B29C 45/0081* (2013.01); *B29C 45/14* (2013.01); *B60R 21/215* (2013.01); *B29K 2101/12* (2013.01); *B29L 2031/3038* (2013.01); *B29L 2031/3041* (2013.01)

(58) Field of Classification Search
CPC .............. B60R 21/215; B60R 21/2165; B29C 45/0062; B29C 45/0081
See application file for complete search history.

(56) References Cited

U.S. PATENT DOCUMENTS

| | | | |
|---|---|---|---|
| 5,219,177 A | * | 6/1993 | Wang .................... B60R 21/215 280/728.3 |
| 5,429,784 A | | 7/1995 | Iannazzi et al. |
| 5,458,361 A | | 10/1995 | Gajewski |
| 5,744,776 A | | 4/1998 | Bauer |
| 6,042,139 A | | 3/2000 | Knox |

(Continued)

FOREIGN PATENT DOCUMENTS

| | | |
|---|---|---|
| KR | 20030010918 A | 2/2003 |
| KR | 20100134473 A | 12/2010 |

OTHER PUBLICATIONS

Non-Final Office Action, U.S. Appl. No. 14/812,345, dated Dec. 15, 2016.

*Primary Examiner* — Barry Gooden, Jr.
(74) *Attorney, Agent, or Firm* — LKGlobal | Lorenz & Kopf, LLP

(57) ABSTRACT

Interior panels having integrated airbag deployment doors for motor vehicles and methods for making such interior panels are provided. In one example, an interior panel for a motor vehicle includes a substrate. The substrate includes a substrate section and an insert. The insert is disposed in the substrate section such that a frangible tear seam is formed along an interface between the insert and the substrate section defining an integrated airbag deployment door in the substrate.

10 Claims, 3 Drawing Sheets

(56) References Cited

U.S. PATENT DOCUMENTS

| | | | |
|---|---|---|---|
| 6,312,633 B1* | 11/2001 | Kiesel | B29C 37/0057 264/125 |
| 6,872,349 B2 | 3/2005 | Hier et al. | |
| 7,160,404 B2 | 1/2007 | Cowelchuk et al. | |
| 7,291,301 B2 | 11/2007 | Cowelchuk et al. | |
| 7,384,061 B2* | 6/2008 | Haba | B60R 21/2165 280/728.3 |
| 7,434,829 B2 | 10/2008 | Cvengros | |
| 7,556,284 B2 | 7/2009 | Riha et al. | |
| 7,926,842 B2 | 4/2011 | Kong | |
| 8,336,907 B2 | 12/2012 | Nogaret et al. | |
| 8,944,460 B2* | 2/2015 | Mazzocchi | B60R 21/215 280/728.2 |
| 2003/0047915 A1* | 3/2003 | Sun | B60R 21/205 280/728.2 |
| 2004/0043683 A1 | 3/2004 | Muench | |
| 2006/0079144 A1 | 4/2006 | Klisch et al. | |
| 2006/0138751 A1* | 6/2006 | Matsuno | B26D 3/08 280/728.3 |
| 2007/0013172 A1* | 1/2007 | Haba | B60R 21/2165 280/728.3 |
| 2007/0101671 A1* | 5/2007 | Deeks | B29C 39/10 52/578 |
| 2009/0278337 A1* | 11/2009 | Springer | B60R 21/2165 280/728.3 |
| 2009/0288542 A1* | 11/2009 | Matsuno | B26D 3/08 83/879 |
| 2010/0078920 A1* | 4/2010 | Terai | B60R 21/215 280/728.3 |
| 2011/0278827 A1* | 11/2011 | Laboeck | B60R 21/2165 280/743.2 |
| 2012/0038133 A1* | 2/2012 | Kalisz | B29C 33/42 280/728.3 |
| 2012/0068441 A1* | 3/2012 | Kalisz | B60R 21/2165 280/728.3 |
| 2013/0249195 A1 | 9/2013 | Hagl | |
| 2013/0270801 A1* | 10/2013 | Zhang | B60R 21/2165 280/728.3 |
| 2016/0375634 A1* | 12/2016 | Magunia | B29C 35/0805 280/743.1 |
| 2018/0201218 A1* | 7/2018 | Zhang | B29C 69/00 |

* cited by examiner

INTERIOR PANELS INCLUDING SUBSTRATES WITH INSERTS FOR DEFINING INTEGRATED AIRBAG DEPLOYMENT DOORS FOR MOTOR VEHICLES AND METHODS OF MAKING THE SAME

TECHNICAL FIELD

The present disclosure relates generally to interior panels for motor vehicles, and more particularly relates to interior panels having integrated airbag deployment doors tier motor vehicles and methods for making such interior panels.

BACKGROUND

Motor vehicles often include an inflatable restraint apparatus having a deployable airbag positioned in or behind an interior vehicle panel, such as an instrument panel, door panel, and the like. Many interior panels include an integrated deployment door formed into the interior panel that is designed to break free upon deployment of the airbag. Controlling the opening of the deployment door is desirable for providing a clean deployment, e.g., minimal or no fragmentation, of the airbag through the interior panel. Often an area of the interior panel surrounding the deployment door is scored or pre-weakened, e.g., via laser scoring, mechanical scoring, or the like, to form a seam that facilitates a clean airbag deployment.

In one example disclosed in U.S. Pat. No. 5,744,776, issued to Bauer, a pre weakening internal groove is formed in an automotive trim piece after the automotive trim piece has been molded or otherwise formed. In particular, an automotive trim piece is formed, for example, by injection molding a polymeric material to form an automotive trim piece cover layer. The automotive trim piece cover layer is then mounted on a fixture and a laser beam impinges the inside surface of the cover layer to form a groove that defines a pre-weakening pattern which functions as an integrated airbag deployment door. A robot arm may be used to move a laser generator so as to form the pre-weakening pattern. Unfortunately, such secondary operations that include, for example, laser generators, robots, and/or fixtures for forming a pre-weakening pattern in an automotive trim piece after molding or otherwise after forming of the automotive trim piece are relatively expensive and can include significant investment and/or operating costs.

Accordingly, it is desirable to provide interior panels having integrated airbag deployment doors for motor vehicles with improved manufacturing efficiencies and/or lower manufacturing costs and methods for making such interior panels. Furthermore, other desirable features and characteristics of the present disclosure will become apparent from the subsequent detailed description and the appended claims, taken in conjunction with the accompanying drawings and this background.

BRIEF SUMMARY

Interior panels having integrated airbag deployment doors for motor vehicles and methods for making such interior panels are provided herein. In an exemplary embodiment, an interior panel for a motor vehicle includes a substrate. The substrate includes a substrate section and an insert. The insert is disposed in the substrate section such that a frangible tear seam is formed along an interface between the insert and the substrate section defining an integrated airbag deployment door in the substrate.

In an exemplary embodiment, a method for making an interior panel for a motor vehicle is provided herein. The method includes the steps of forming an insert. A substrate is insert molded including positioning the insert in a molding tool. A molten plastic material is advanced and solidified in the molding tool to form a substrate section about the insert such that an insert quasi-knit line is formed along an interface between the insert and the substrate section. At least a portion of the insert quasi-knit line defines a frangible tear seam that defines an integrated airbag deployment door in the substrate.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
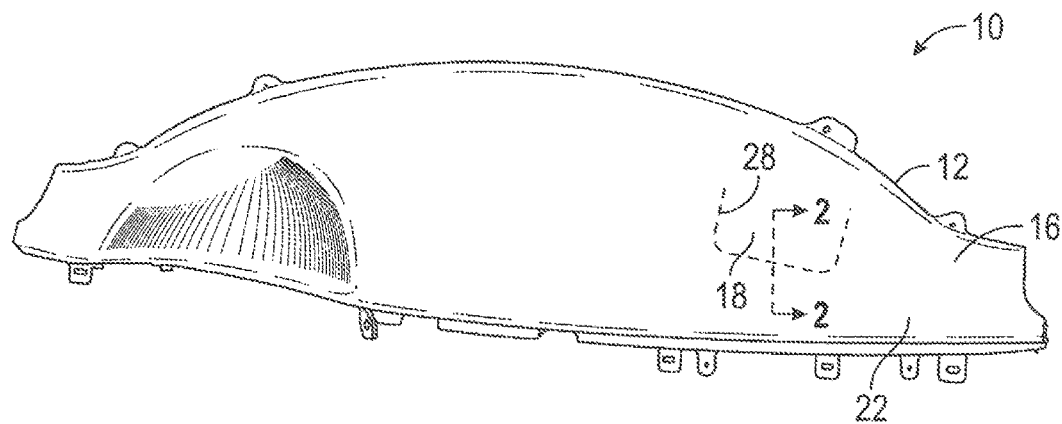
FIG. 1 is a perspective view of an interior panel for a motor vehicle in accordance with an exemplary embodiment.

The following Detailed Description is merely exemplary in nature and is not intended to limit the disclosure or the application and uses of the disclosure. Furthermore, there is no intention to be bound by any theory presented in the preceding background or the following detailed description.

Various embodiments contemplated herein relate to interior panels having integrated airbag deployment doors for motor vehicles and methods for making such interior panels. The exemplary embodiments taught herein provide an interior panel that includes a substrate. The substrate includes a substrate section and an insert. The insert is disposed in the substrate section such that a frangible tear seam is formed along an interface between the insert and the substrate section defining an integrated airbag deployment door in the substrate.

In an exemplary embodiment, the substrate is formed via an insert molding process. In one example, the insert is made of a plastic material and is elongated, extending longitudinally to define an outer perimeter of a "door flap-shaped" pattern (e.g., a "U-shaped" pattern or alternatively an "H-shaped" pattern). The insert is positioned in a molding tool. The molding tool has matched molding tool portions that define a molding tool cavity when the matched molding tool portions are positioned in a "closed mold" configuration. During the insert molding process, polymeric resin (e.g., plastic material) is heated to form a molten plastic material that is advanced in a fluidized state in the molding tool cavity including over, on, and/or about the insert. In an exemplary embodiment, when the molten plastic material contacts the insert, a quasi-knit line (hereinafter "insert quasi-knit line") is formed at the interface between the molten plastic material and the insert. An insert quasi-knit line is herein understood to mean a weakening line that is formed when a molten plastic material flow front contacts and partially solidifies on contact with a solid and typically cooler insert material. The molten plastic material is solidified via cooling in the molding tool to form the substrate section that is disposed about the insert. The substrate is then removed from the molding tool. In an exemplary embodiment, a portion of the insert quasi-knit line that is formed along a sidewall (e.g., an airbag deployment door facing sidewall) of the insert forms the frangible tear seam.

In an exemplary embodiment, the substrate may be used "as is" or may be further decorated for use as an interior panel for a motor vehicle in which the frangible tear seam defines the integrated airbag deployment door. In an exemplary embodiment, the frangible tear seam is configured to rupture, for example, during an airbag deployment to allow the integrated airbag deployment door to open, thereby forming an opening in the substrate to allow an airbag to deploy through the substrate. Advantageously, by using an insert to form an insert quasi-knit line that defines a frangible tear seam during the insert molding fabrication stage of the substrate, subsequent secondary operations for forming a pre-weakening pattern in the substrate are not needed thereby improving manufacturing efficiencies and/or reducing manufacturing costs.

Figure 2:
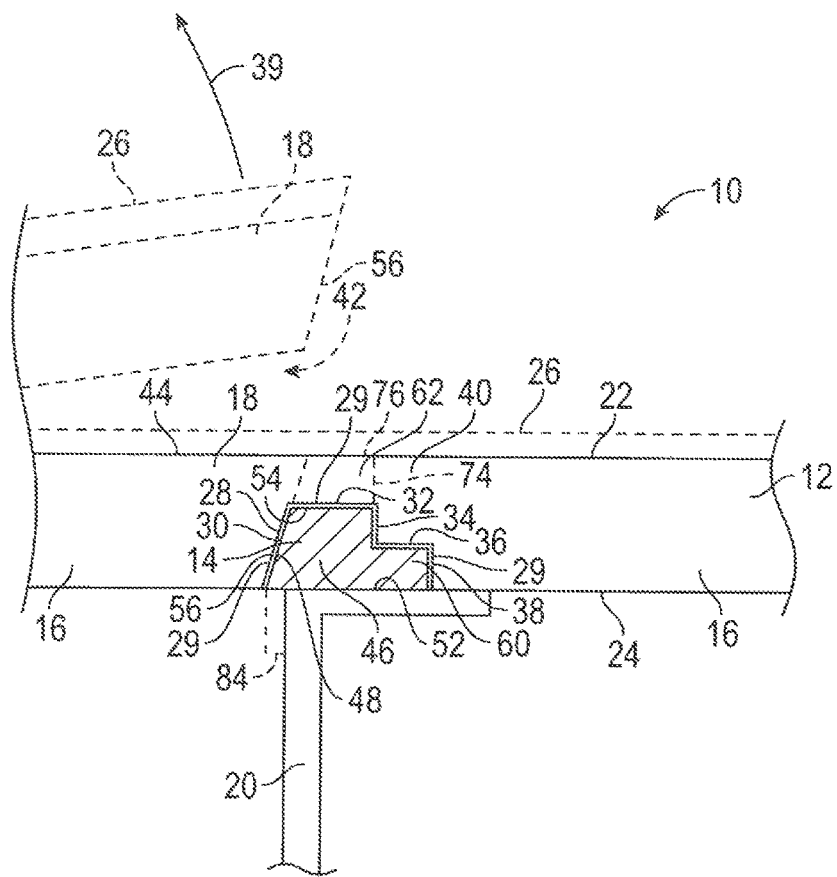
FIG. 2 is a sectional view of the interior panel depicted in FIG. 1 along line 2-2.
Figure 3:
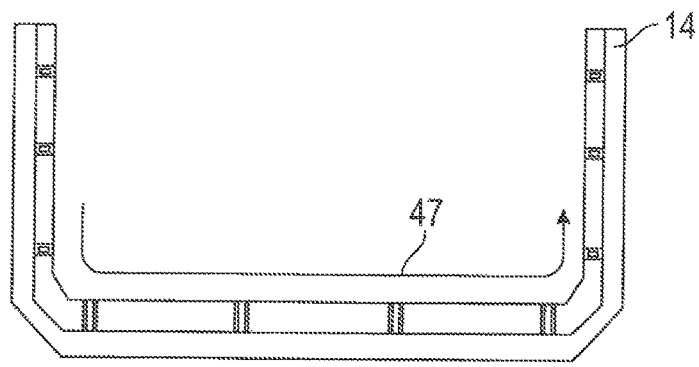
FIG. 3 is a top view of an insert in accordance with an exemplary embodiment.

FIG. 1 is a perspective view of an interior panel 10 for a motor vehicle in accordance with an exemplary embodiment, FIG. 2 is a sectional view of the interior panel 10 depicted in FIG. 1 along line 2-2. In an exemplary embodiment, the interior panel 10 is an instrument panel that can be positioned forward of a driver seat and a front passenger seat of a motor vehicle. As such, FIG. 2 depicts a view of the interior panel 10 forward of the front passenger seat. Alternatively, the interior panel 10 can be a door panel or other interior vehicle trim panel.

As illustrated, the interior panel 10 comprises a substrate 12. The substrate 12 includes an insert 14 and a substrate section 16 that is disposed about the insert 14. In an exemplary embodiment, the substrate section 16 includes an integrated airbag deployment door 18. A chute 20 is operatively coupled to the substrate 12 and is for receiving an airbag module (not shown) and to direct a deployable airbag (not shown) from the airbag module towards the integrated airbag deployment door 18 during airbag deployment.

The substrate 12 has an outer surface 22 that faces towards the interior of the motor vehicle and an inner surface 24 that faces away from the interior of the motor vehicle. As will be discussed in further detail below, the insert 14 and the substrate section 16 may be formed of the same material or different materials. In an exemplary embodiment, the insert 14 and, independently, the substrate section 16 may be formed of a plastic material, such as, for example, polypropylene (PP) and/or thermoplastic olefin (TPO), styrene maleic anhydride (SMA), polycarbonate (PC), ABS, PC/ABS, or any other substrate material for vehicle interior applications known to those skilled in the art. The plastic material may include one or more other ingredients, such as rubber, fillers such as talc and the like, impact modifiers, stabilizers, processing additives and/or mold release agents, reinforcing fibers such as glass fibers, natural fibers, and the like, anti-scratch additives, pigments and/or molded-in-color additives, adhesion promoters, recycled product, and the like. The chute 20 may be formed of a polymeric material such as thermoplastic elastomer (TPE), TPO, PP, and/or the like.

The outer surface 22 of the substrate 12 can be a hard decorative surface, such as a mold-in-color surface, a painted surface, or the like. Alternatively, the outer surface 22 of the substrate 12 can be covered with a covering 26 such as skin and foam, such as in well-known foam-in-place or tri-laminate constructions, to provide a "soft instrument panel," or as a "wrapped panel" in which the covering 26 may be leather, vinyl, a bi-laminate construction, or the like.

As illustrated, the insert 14 is disposed in the substrate section 16 and a frangible tear seam 28 is formed along an interface 30 between the insert 14 and the substrate section 16 defining the integrated airbag deployment door 18. In an exemplary embodiment, the integrated airbag deployment door 18 is formed in a part of the substrate section 16 that is disposed laterally adjacent to the insert 14.

Referring to FIG. 2 and as will be discussed in further detail below, in an exemplary embodiment, an insert quasi-knit line 29 is formed along the interfaces 30, 34, 36, and 38 between the insert 14 and the substrate section 16. In an exemplary embodiment, the insert 114 and the substrate section 16 are cooperatively configured such that during airbag deployment, the insert 14 is secured to an outboard portion 40 of the substrate section 16 along the interfaces 32, 34, 36, and 38 while the portion of the insert quasi-knit line 29 that is disposed along the interface 30 functions as the frangible tear seam 28 that ruptures. Advantageously, this allows an inboard portion 44 of the substrate section 16 to cleanly detach (e.g., with minimal or no fragmentation) from the outboard portion 40 and to move in a direction (indicated by single headed arrow 39) as the integrated airbag deployment door 18, which is being urged to an open position by a deploying airbag, thereby forming an opening 42 in the substrate 12 to allow the airbag to advance through the substrate 12.

Referring to FIGS. 2-5, the insert 14 has a cross-section 46 (see FIGS. 2 and 5) that may be configured as a constant or non-variable cross-section, or alternatively, as a variable cross-section. In an exemplary embodiment, the insert 14 is an elongated insert (e.g., extending longitudinally) and is defined by projection of the cross-section 46 along a door flap shape-defining direction (indicated by variable direction arrow 47 shown in FIG. 3). In an exemplary embodiment, the door flap shape-defining direction 47 is configured to define a substantially U-shaped integrated airbag deployment door as illustrated in FIG. 1. Alternatively, the door flap shape-defining direction 47 may be configured to define a differently shaped integrated airbag deployment door arrangement, such as, for example, a substantially H-shaped bi-partitioning integrated airbag deployment door arrangement or the like.

Figure 5:
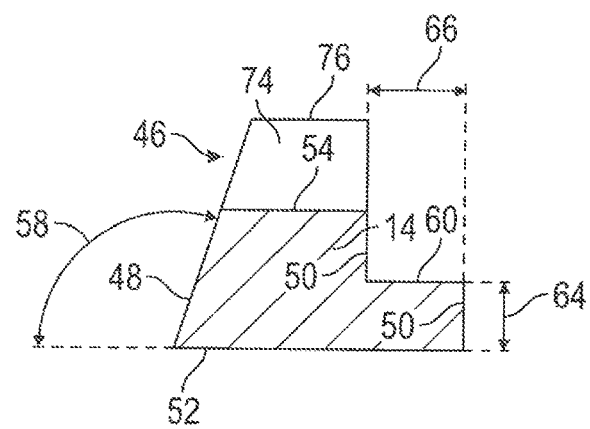
FIG. 5 is a sectional view of e insert depicted in FIG. 4 along line 5-5.

In an exemplary embodiment and as illustrated in FIGS. 2 and 5, the cross-section 46 of the insert 14 is a configured as a variable substantially L-shaped cross-section. In particular, the cross-section 46 of the insert 14 has an airbag deployment door facing sidewall 48 that extends along the interface 30, an outer sidewall 50 that face opposite the airbag deployment door facing sidewall 48, a base section 52 that is generally planar with the inner surface 24 of the substrate 12, and an intermediate upper section 54 that is disposed between the outer surface 22 and the inner surface 24 of the substrate 12. In an exemplary embodiment, the airbag deployment door facing sidewall 48 is positioned at an incline such that at least a portion of the cross-section 46 of the insert 14 that faces the integrated airbag deployment door 18 tapers inwardly from the inner surface 24 towards the outer surface 22 of the substrate 12 to advantageously facilitate a clean opening (e.g., with minimal or no fragmentation) of the integrated airbag deployment door 18 during airbag deployment. In an exemplary embodiment, the integrated airbag deployment door 18 has a beveled outer edge 56 that matchingly interfaces with the airbag deployment door facing sidewall 48 to advantageously further facilitate a clean opening of the integrated airbag deployment door 18. In an exemplary embodiment, the airbag deployment door facing sidewall 48 extends from the inner surface 24 toward the outer surface 22 of the substrate 12 at an angle (indicated by single headed arrow 58) of from about 91 to about 135 degrees.

As illustrated in FIGS. 2 and 5, in an exemplary embodiment, the outer sidewall 50 of the cross-section 46 is configured to define an interlock step 60 to help secure the insert 14 to the outboard portion 40 of the substrate section 16 during airbag deployment. Additionally, an overhang portion 62 of the substrate section 16 that extends from the outboard portion 40 to the inboard portion 44 of the substrate section 16 is disposed over the intermediate upper section 54 of the insert 14 to further help secure the insert 14 to the substrate section 16 during airbag deployment to advantageously facilitate a clean opening of the integrated airbag deployment door 18. In particular, in an exemplary embodiment, during airbag deployment the intermediate upper section 54 and the interlock step 60 of the insert 14 cooperate with the substrate section 16 to hold the insert 14 in place by compressing the portions of the insert quasi-knit line 29 that are disposed along the interfaces 32, 34, 36, and 38 against the matching portions of the substrate section 16 while the portion of the insert quasi-knit line 29 that is disposed along the interface 30 is sheared when the integrated airbag deployment door 18 is urged to move in the direction 39, thereby rupturing the frangible tear seam 28.

Figure 4:
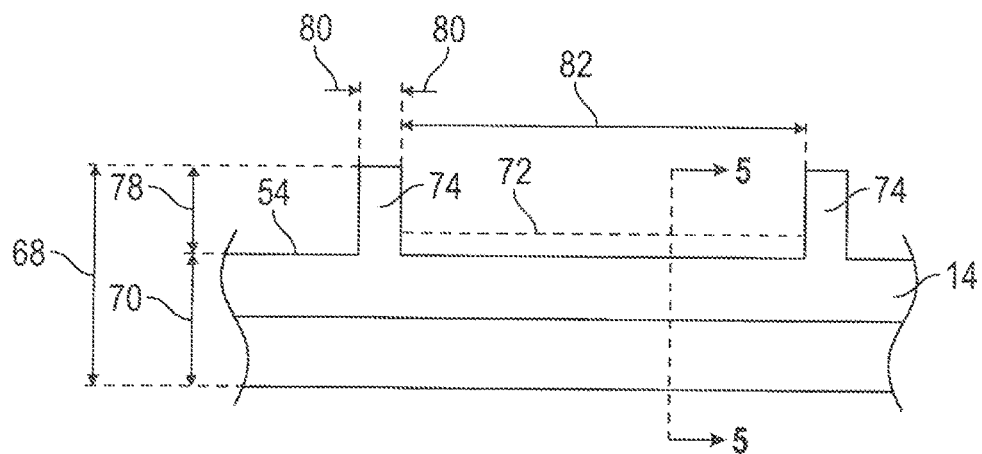
FIG. 4 is a front view of a portion of an insert in accordance with an exemplary embodiment.

Referring to FIGS. 2-5, in an exemplary embodiment, the interlock step 60 has a height (indicated by double headed arrow 64) of from about 0.5 to about 2 mm and a depth (indicated by double headed arrow 66) of from about 0.5 to about 2 mm. In an exemplary embodiment, the insert 14 has an overall height (indicated by double headed arrow 68) of from about 2.5 to about 5 mm, which corresponds to the overall thickness of the substrate 12, and an intermediate height (indicated by doable headed arrow 70) that is defined as the distance from the base section 52 to the intermediate upper section 54 of from about 1.5 to about 2.5 mm. As illustrated in FIG. 4, the intermediate height 70 can vary locally to change the position of the intermediate upper section 54 (modified position of the intermediate upper section 54 indicated by dashed line 72), which effectively alters the length and strength of the frangible tear seam 28 along the interface 30 to facilitate a clean opening of the integrated airbag deployment door 18.

In an exemplary embodiment, the insert 14 has a plurality of standoffs 74 that extend from the intermediate upper section 54 to the outer surface 22 of the substrate 12. In an exemplary embodiment and as will be discussed in further detail below, the standoffs 74 facilitate positioning the insert 14 in a molding tool during fabrication of the substrate 12. In an exemplary embodiment, the standoffs 74 have been uppermost surface 76 that is matched and co-planar with the surrounding portions of the outer surface 22 of the substrate 12 to advantageously minimize or eliminate any readthrough of the insert 14 to improve the aesthetic appearance of the substrate 12. In an exemplary embodiment, the standoffs 74 have a height (indicated by double headed arrow 78) of from about 0.5 to about 2 mm and independently, a width (indicated by arrows 80) of from about 0.5 to about 2 mm. In an exemplary embodiment, the standoffs 74 are spaced apart from each other a distance (indicated by double headed arrow 82; of from about 15 to about 75 mm.

Referring to FIG. 4, the insert 14 may optionally include a down standing rib 84 that extends from the base section 52 laterally adjacent to the chute 20. In an exemplary embodiment, advantageously the down standing rib 84 helps stiffen the insert 14 and/or facilitates attaching, and/or locating the chute 20 to the insert 14 and/or to the substrate section 16, for example, using a vibration welding process or the like.

Figure 6:
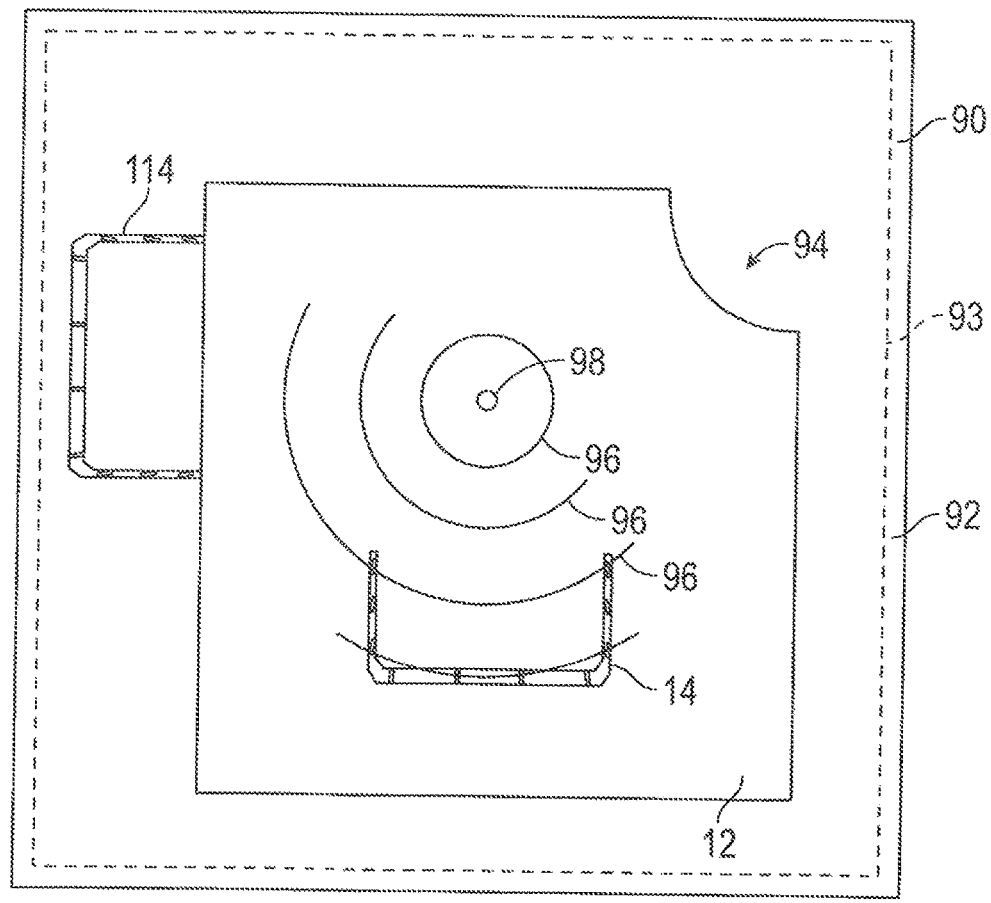
FIG. 6 is a top view of an interior panel in a molding tool and a method for making an interior panel for a motor vehicle in accordance with an exemplary embodiment.

FIG. 6 is a top view of a molding tool 90 for fabricating the substrate 12 of the interior panel 10 (shown in FIGS. 1-2) in accordance with an exemplary embodiment. The molding tool 90 includes molding tool portions 92 and 93 that may be moved relative to each other during an insert, molding process, such as, for example, an insert injection molding process as is well-known in the art. The molding tool portions 92 and 93 are a match die set and define a molding tool cavity 94 when the molding tool portions 92 and 93 are positioned in contact with each other in the closed mold configuration.

As illustrated, the molding tool 90 contains two inserts 14 and 114. In particular, in an exemplary embodiment, the molding tool 90 is a "family molding tool" in which the insert 114 is formed concurrently during the insert molding process as described below while the insert 14 was formed previously either in the molding tool 90 similarly to the insert 114. Alternatively, the insert 114 can be formed in a separate molding tool. In an exemplary embodiment, the insert 14 is positioned in the molding tool 90 and has standoffs 74 (shown in FIG. 4-5) as discussed above that are used to help position and/or locate the insert 14 in the molding tool 90. Alternatively, the molding tool 90 may have positive features (e.g., pins) and/or action that may be used to help position and/or locate the insert 14 in the molding tool 90.

During an injection cycle of the insert molding process, a molten plastic material 96 is advanced through one or more gates 98 into the molding tool cavity 94. In an exemplary embodiment, the molten plastic material 96 is a plastic material as discussed above in a molten state. In an exemplary embodiment, the molten plastic material 96 has a temperature of from about 150 to about 310° C.

The molten plastic material 96 advances through the molding tool cavity 94 and contacts the insert 14 to form the insert quasi-knit line 29 along the interfaces 30, 32, 34, 36, and 38 (shown in FIG. 2) of the insert 14 as discussed above. In an exemplary embodiment, the insert 14 is cooler than the molten plastic material 96 and has a temperature of from about 15 to about 50° C. to advantageously help form the insert quasi-knit line 29 (shown in FIG. 2) as weakened lines or interfaces. Additionally, the molten plastic material 96 substantially fills the molding tool cavity 94 for "packing out" and forming the insert 114.

The process continues by solidifying the molten plastic material 96 to form the substrate 12 with the insert 114 attached to the perimeter of the substrate 12. In an exemplary embodiment, the molten plastic material 96 is cooled in the molding tool 90, for example, to a temperature of about 50° C. or less (e.g., from about 15 to about 50° C.) to solidify the molten plastic material 96 as is well-known in the art. The molding tool portions 92 and 93 are moved apart and the substrate 12 is removed from the molding tool 90 using, for example, "end of arm tooling" that additionally removes the insert 114 from the substrate 12 and positions the insert 114 back into the molding tool 90 for the next insert molding cycle.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel for a motor vehicle comprising:
a substrate comprising:
a substrate section; and
an insert disposed in the substrate section such that a frangible tear seam is formed along an interface between the insert and the substrate section defining an integrated airbag deployment door in the substrate,
wherein the substrate has an outer surface and an inner surface that is opposite the outer surface and has a beveled outer edge that extends along the interface and that is at an incline at an angle from the inner surface towards the outer surface, the integrated airbag deployment door is disposed in the substrate section laterally adjacent to the insert, and the insert extends longitudinally along a door flap shape-defining direction and is defined by projection of an optionally variable cross-section along the door flap shape-defining direction, and wherein the optionally variable cross-section has an airbag deployment door facing sidewall which extends along the interface at the incline such that at least a portion of the optionally variable cross-section that faces the integrated airbag deployment door tapers inwardly from the inner surface towards the outer surface, and
wherein the optionally variable cross-section has an outer sidewall facing opposite the airbag deployment door facing sidewall, and wherein the outer sidewall defines an interlock step for securing the insert to the substrate section during airbag deployment.

2. The interior panel of claim 1, wherein the integrated airbag deployment door has a beveled outer edge matchingly interfacing with the airbag deployment door facing sidewall.

3. The interior panel of claim 1, wherein the angle at which the airbag deployment door facing sidewall extends from the inner surface towards the outer surface is from 91 to 135 degrees.

4. The interior panel of claim 1, wherein the optionally variable cross-section is configured as a variable substantially L-shaped cross-section.

5. The interior panel of claim 1, wherein the optionally variable cross-section has an intermediate upper section that is disposed between and spaced apart from the outer surface and the inner surface of the substrate.

6. The interior panel of claim 1, wherein the door flap shape-defining direction is configured to define a substantially U-shaped integrated airbag deployment door.

7. An interior panel for a motor vehicle comprising:
a substrate comprising:
a substrate section; and
an insert disposed in the substrate section such that a frangible tear seam is formed along an interface between the insert and the substrate section defining an integrated airbag deployment door in the substrate,
wherein the substrate has an outer surface and an inner surface that is opposite the outer surface and has a beveled outer edge that extends along the interface and that is at an incline at an angle from the inner surface towards the outer surface, the integrated airbag deployment door is disposed in the substrate section laterally adjacent to the insert, and the insert extends longitudinally along a door flap shape-defining direction and is defined by projection of an optionally variable cross-section along the door flap shape-defining direction, and wherein the optionally variable cross-section has an airbag deployment door facing sidewall which extends along the interface at the incline such that at least a portion of the optionally variable cross-section that faces the integrated airbag deployment door tapers inwardly from the inner surface towards the outer surface, and wherein
the optionally variable cross-section has a base section that is generally planar with the inner surface of the substrate section and the insert has a down standing rib that extends from the base section.

8. The interior panel of claim 7, further comprising a chute operatively coupled to the insert along the base section laterally adjacent to the integrated airbag deployment door.

9. An interior panel for a motor vehicle comprising:
a substrate comprising:
a substrate section; and
an insert disposed in the substrate section such that a frangible tear seam is formed along an interface between the insert and the substrate section defining an integrated airbag deployment door in the substrate,
wherein the substrate has an outer surface and an inner surface that is opposite the outer surface and has a beveled outer edge that extends along the interface and that is at an incline at an angle from the inner surface towards the outer surface, the integrated airbag deployment door is disposed in the substrate section laterally adjacent to the insert, and the insert extends longitudinally along a door flap shape-defining direction and is defined by projection of an optionally variable cross-section along the door flap shape-defining direction, and wherein the optionally variable cross-section has an airbag deployment door facing sidewall which extends along the interface at the incline such that at least a portion of the optionally variable cross-section that faces the integrated airbag deployment door tapers inwardly from the inner surface towards the outer surface, and wherein
the insert has a plurality of standoffs that extend from the intermediate upper section of the insert to the outer surface of the substrate.

10. The interior panel of claim 9, wherein the plurality of standoffs are spaced apart from each other a distance of from 15 to 75 mm.

* * * * *